(12) United States Patent
Lee et al.

(10) Patent No.: US 8,371,823 B2
(45) Date of Patent: Feb. 12, 2013

(54) APPARATUS AND METHOD FOR CONTROLLING OPERATION OF ELECTRIC OIL PUMP

(75) Inventors: Hak Sung Lee, Gyeonggi-do (KR); Seung Ki Kong, Gyeonggo-do (KR); Jin Sook Lee, Gyeonggo-do (KR); Jae Shin Yi, Gyeonggo-do (KR); Yeon Ho Kim, Gyeonggo-do (KR); Baek Yu Kim, Gyeonggo-do (KR); Sang Hyun Jeong, Gyeonggo-do (KR); Jong Hyun Kim, Gyeonggo-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 311 days.

(21) Appl. No.: 12/833,463

(22) Filed: Jul. 9, 2010

(65) Prior Publication Data
US 2011/0135499 A1 Jun. 9, 2011

(30) Foreign Application Priority Data
Dec. 4, 2009 (KR) ................ 10-2009-0119793

(51) Int. Cl.
*F04B 49/06* (2006.01)
(52) U.S. Cl. .................. 417/44.1; 417/22
(58) Field of Classification Search .......... 417/22, 417/44.1, 44.11
See application file for complete search history.

(56) References Cited

U.S. PATENT DOCUMENTS
6,869,272 B2 * 3/2005 Odachi et al. ........ 417/44.1

FOREIGN PATENT DOCUMENTS
| JP | 2005-207491 A | 8/2005 |
| JP | 2006-161850 A | 6/2006 |
| JP | 2006-161851 A | 6/2006 |
| JP | 2009-096326 A | 5/2009 |

* cited by examiner

*Primary Examiner* — Charles Freay
*Assistant Examiner* — Patrick Hamo
(74) *Attorney, Agent, or Firm* — Edwards Wildman Palmer LLP; Peter F. Corless

(57) ABSTRACT

The present invention provides an apparatus and method for controlling the operation of an electric oil pump for creating a working fluid pressure in a transmission and a clutch for a hybrid vehicle, which can accurately reflect the viscosity characteristics of oil to accurately control the operation of the pump, instead of measuring the temperature of the oil to reflect the state of the oil. In preferred embodiments, the present invention provides an apparatus for controlling the operation of an electric oil pump, the apparatus including: a current detector for detecting a current applied to a motor of an electric oil pump; a rotational speed detector for detecting a rotational speed of the motor; and a controller for calculating a load torque of the motor based on the detection values of the current detector and the rotational speed detector, calculating a target rotational speed based on the detection values, and controlling the operation of the motor based on the target rotational speed.

2 Claims, 8 Drawing Sheets

APPARATUS AND METHOD FOR CONTROLLING OPERATION OF ELECTRIC OIL PUMP

CROSS-REFERENCE TO RELATED APPLICATION

This application claims under 35 U.S.C. §119(a) the benefit of Korean Patent Application No. 10-2009-0119793 filed Dec. 4, 2009, the entire contents of which are incorporated herein by reference.

BACKGROUND (a) Technical Field

The present disclosure relates, generally, to an electric oil pump. More particularly, it relates to an apparatus and method for controlling the operation of an electric oil pump for creating a working fluid pressure in a transmission and a clutch for a hybrid vehicle.

(b) Background Art

Hybrid vehicles are the vehicles of the future that employ a motor as an auxiliary power source as well as a gasoline engine to provide a reduction in exhaust gas and an improvement in fuel efficiency. As shown in FIG. 1, a typical hybrid vehicle includes an engine 10 and a drive motor 30 as power sources for running the vehicle, an engine clutch 20 for connecting the engine 10 and the drive motor 30, an integrated-starter generator (ISG) 11, a high voltage battery 31, and an inverter 32, which are used for the operation of the engine 10 and the drive motor 30.

Further, a transmission 40 for transmitting power to a drive shaft 1 is suitably connected to an output of the drive motor 30, an electric oil pump (EOP) 71 and a mechanical oil pump (MOP) 75 are provided to supply working fluid pressure to the engine clutch 20 and the transmission 40, and an auxiliary battery 74 is preferably provided to supply driving power to the electric oil pump 71.

Although not shown in the figure, a hybrid control unit (HCU), a motor control unit (MCU), and a battery management system (BMS) are provided as control means for the components. Moreover, a transmission control unit (TCU) 61 for controlling the transmission 40 and an electric oil pump control unit (OPU) 62 for directly controlling the operation of the electric oil pump 71 are further provided.

Preferably, the hybrid vehicle with the above-described configuration is driven in an electric vehicle (EV) mode, which is a pure electric vehicle mode using only the power of the drive motor 30 which is suitably transmitted to the transmission 40, or in a hybrid electric vehicle (HEV) mode, which is an auxiliary mode using both the power of the engine 10 as a main power source and the power of the drive motor 30 as an auxiliary power source which are transmitted to the drive shaft 1 through the clutch 20 and the transmission 40.

In the hybrid vehicle, the electric oil pump 71 is driven by the power of the auxiliary battery 74 under the control of the TCU 61 and OPU 62 and the mechanical oil pump 75 is connected to a drive shaft of the drive motor 30 and is driven by the mechanical energy serve to produce a hydraulic pressure by supplying working fluid to control valves of the transmission 40 and the clutch 20 when a driver wishes to start his or her vehicle.

FIG. 2 shows the flow of automatic transmission fluid (ATF) used for the operation of the transmission and the clutch, in which the electric oil pump 71 and the mechanical oil pump 75 are driven to suitably supply the oil stored in an oil tank 51 to a valve body 53 through a hydraulic line 52.

Typically, the electric oil pump 71 supplies hydraulic pressure to the hydraulic line 52 in the EV mode, and the mechanical oil pump 75 supplies hydraulic pressure to the hydraulic line 52 together with the electric oil pump 71 in the HEV mode (in which the engine is driven and the engine clutch is connected).

Accordingly, FIG. 3 shows the drive modes of a typical electric oil pump. As shown in FIG. 3, the operation of the electric oil pump is suitably controlled in various drive modes according to the state of the vehicle. Preferably, the drive modes may be classified in to a high speed control mode as an initial operating condition, in which the pump is driven at high speed for a short period of time, such as several seconds, to ensure the hydraulic pressure response during start-up (IG, START ON), a low speed control mode, in which the pump is driven at low speed to minimize the power consumption under idle conditions when the vehicle is stopped (vehicle speed is 0 & brake is on, or gear lever is in N or P), a middle speed control mode as a normal operating condition, in which the pump is driven at middle speed when the vehicle is normally driven, and a non-control mode in which the operation of the pump is stopped (EOP is off/MOP is on).

Here, preferably, the high speed control mode is suitably performed to ensure the hydraulic pressure response by applying high hydraulic pressure to the hydraulic line with high pressure pumping force for a predetermined period of time, and the middle speed control mode is performed when the vehicle is normally driven.

Preferably, the entrance into the middle speed control mode and the non-control mode is suitably determined based on the rotational speed of the mechanical oil pump and the transmission input torque. In the non-control mode, the operation of the electric oil pump is suitably stopped, and thus only the mechanical oil pump supplies hydraulic pressure to the hydraulic line.

Further, in order to produce a line pressure required in the transmission and the clutch in the control of the operation of the electric oil pump, it is necessary to drive the pump at an optimal rotational speed. Typically, the pump is suitably controlled at a predetermined target rotational speed based on the temperature of the oil (ATF) in each drive mode.

Preferably, the TCU extracts a target rotational speed (RPM) according to the oil temperature from stored data for each drive mode and suitably transmits it to the OPU through a CAN communication. Then, the OPU controls the operation of the motor of the electric oil pump based on the target rotational speed transmitted from the TCU and, at the same time, feeds back the control result to the TCU.

FIG. 4 shows an example in which the rotational speed of the motor is controlled based on the oil temperature. Preferably, since the load torque varies according to the oil viscosity, the rotational speed of the motor is controlled based on the oil temperature which is significantly associated with the oil viscosity. Referring to FIG. 4, for example, the higher the oil temperature, the more the oil viscosity is reduced. Thus, if the oil viscosity is lower, the rotational speed of the motor of the pump is increased to form a pressure defined in the hydraulic line.

As such, the oil temperature reflecting the oil viscosity and measured by a temperature sensor is used as a control variable. Although it is necessary to control the driving speed based on an accurate actual viscosity value of fluid in the control of the operation of the pump, the measurement value of the temperature sensor is used to control the operation of the pump in a typical vehicle.

However, the viscosity characteristics of the oil are changed as the use of the transmission continues, which are different from those of a new product, and thus it is impossible to accurately predict the actual load torque.

Preferably, in the case where the oil temperature is measured to reflect the oil viscosity during the control of the rotational speed of the motor in the conventional manner, a temperature-rotational speed map reflecting the initial conditions of new oil is used as it is, and thus after the elapse of a predetermined time, it can be difficult to accurately reflect the actual state of the oil to control the operation of the pump.

Accordingly, there remains a need in the art for apparatus and methods for controlling the operation of an electric oil pump.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an apparatus and method for controlling the operation of an electric oil pump, which can accurately reflect the viscosity characteristics of oil to accurately control the operation of the pump, instead of measuring the temperature of the oil to reflect the state of the oil.

In one preferred embodiment, the present invention provides an apparatus for controlling the operation of an electric oil pump, the apparatus preferably including a current detector for detecting a current applied to a motor of an electric oil pump; a rotational speed detector for detecting a rotational speed of the motor; and a controller for calculating a load torque of the motor based on the detection values of the current detector and the rotational speed detector, suitably calculating a target rotational speed based on the detection values, and suitably controlling the operation of the motor based on the target rotational speed.

In another preferred embodiment, the present invention provides a method for controlling the operation of an electric oil pump, the method including detecting, at a current detector, a current applied to a motor of an electric oil pump; detecting, at a rotational speed detector, a rotational speed of the motor; suitably calculating a load torque of the motor based on the current and the rotational speed detected by the current detector and the rotational speed detector and suitably calculating a target rotational speed based on the detection values; and suitably controlling the operation of the motor of the pump based on the calculated target rotational speed.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
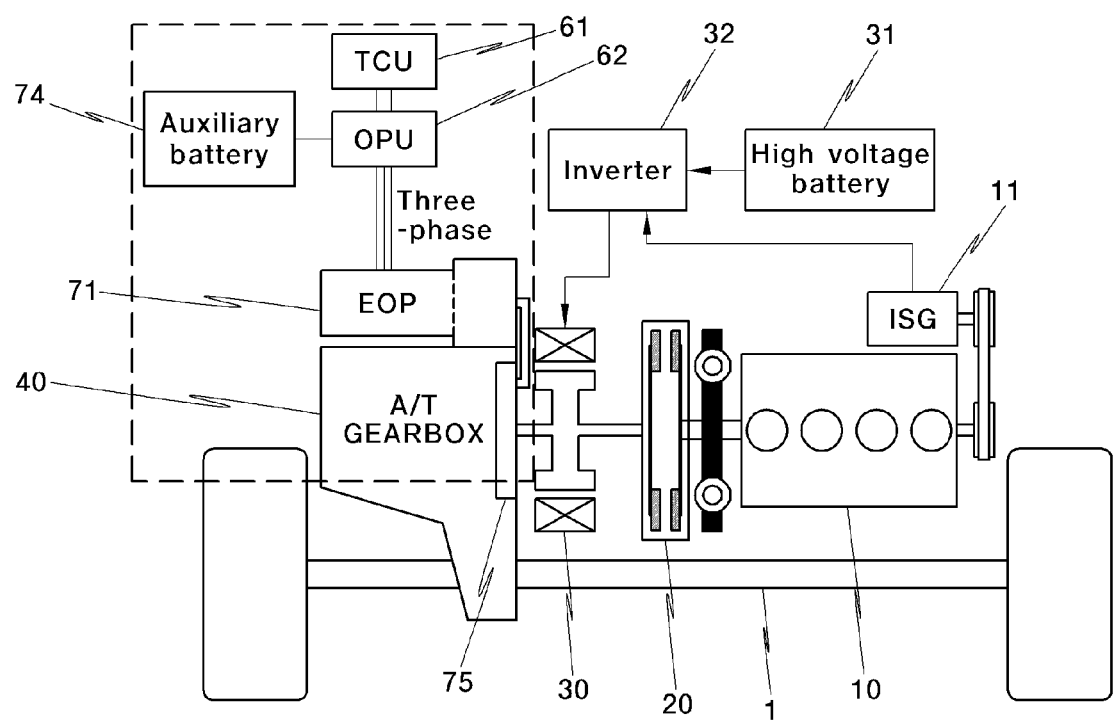
FIG. 1 is a schematic diagram showing a typical hybrid system.
Figure 2:
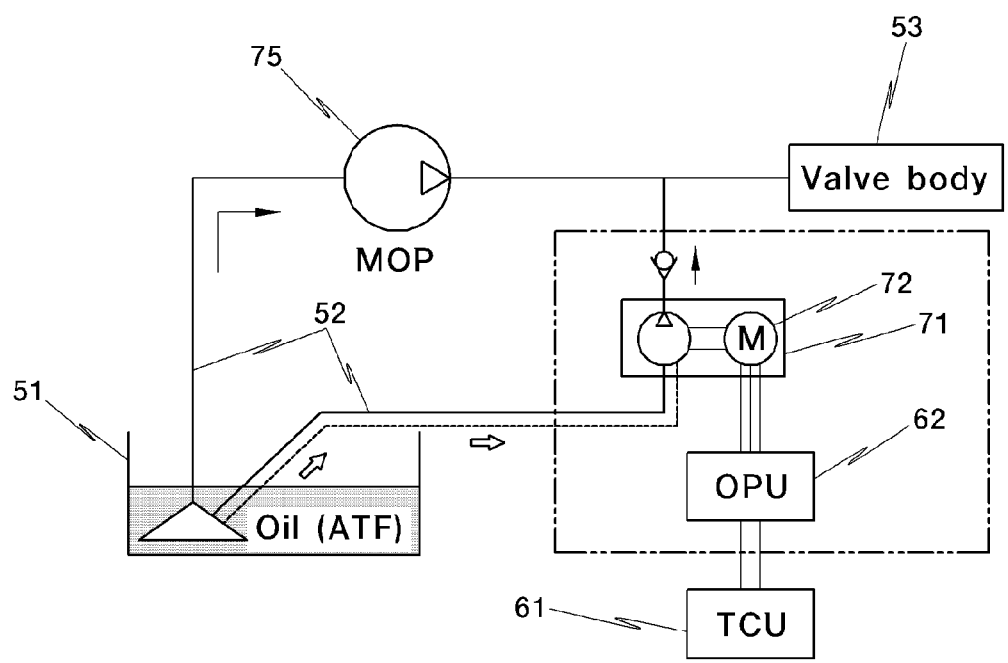
FIG. 2 is a diagram showing the flow of automatic transmission fluid (ATF) used for the operation of a transmission and a clutch.
Figure 3:
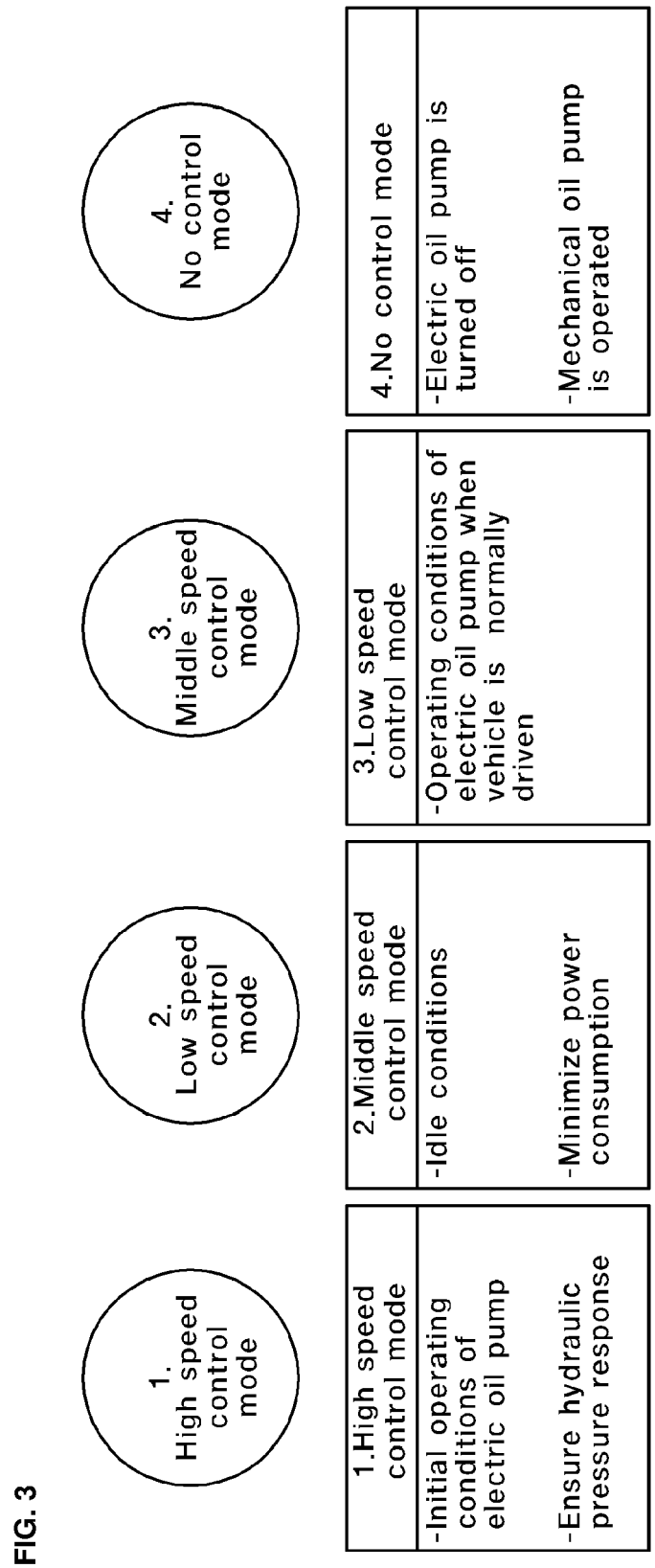
FIG. 3 is a diagram showing the drive modes of a typical electric oil pump.
Figure 4:
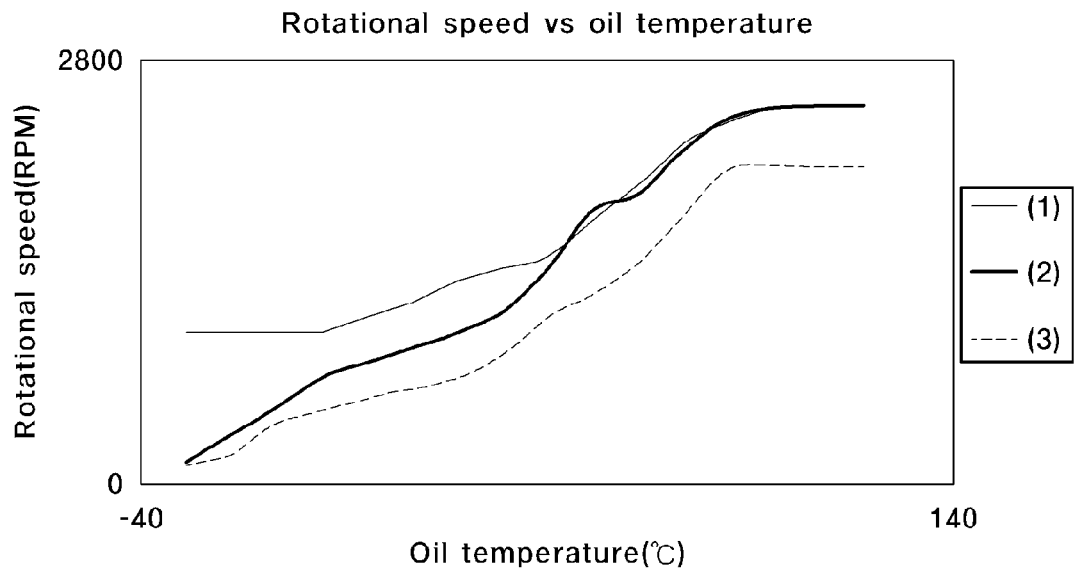
FIG. 4 is a diagram showing an example in which the rotational speed of a motor of a pump is controlled based on the temperature of oil according to a conventional method.

Reference numerals set forth in the Drawings includes reference to the following elements as further discussed below:

| | |
|---|---|
| 40: transmission | 52: hydraulic line |
| 53: valve body | 60: controller |
| 61: transmission control unit | 62: oil pump control unit |
| 63: current detector | 71: electric oil pump |
| 72: motor | 73: rotational speed detector |
| 74: auxiliary battery | 75: mechanical oil pump |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

According to one preferred aspect, the present invention features a method for controlling the operation of an electric oil pump, the method comprising detecting a current applied to a motor of an electric oil pump, detecting a rotational speed of the motor, calculating a load torque of the motor based on the current and the rotational speed, calculating a target rotational speed based on the current and the rotational speed, and controlling the operation of the motor of the pump based on the calculated target rotational speed.

In one embodiment, the current applied to a motor of an electric oil pump is detected at a current detector.

In another embodiment, the rotational speed of the motor is detected with a rotational speed detector.

In another further preferred embodiments, the load torque of the motor is calculated based on the current and the rotational speed detected by the current detector and the rotational speed detector.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

According to certain preferred embodiments, the present invention preferably provides an apparatus and method for controlling the operation of an electric oil pump for creating a working fluid pressure in a transmission and a clutch for a hybrid vehicle, which can accurately reflect the actual viscosity characteristics of oil to accurately control the operation of the pump.

Conventionally, the oil temperature is suitably measured by a temperature sensor and a target rotational speed is suitably extracted from the measured temperature using a temperature-RPM map so as to control the operation of the pump. However, since the temperature-RPM map reflecting the initial conditions of new oil is used as fixed data, it is impossible to accurately reflect the actual state of the oil to control the rotational speed of the motor.

In order to solve this problem, it is necessary to accurately measure the actual oil viscosity and a load torque based on the oil viscosity. Accordingly, in the present invention, the actual load torque of the motor of the pump is suitably calculated to control the operation of the pump, instead of measuring the temperature of the oil to reflect the state of the oil. Since the load torque reflects the current state of the oil, it is possible to more accurately control the operation of the oil pump.

Figure 5:
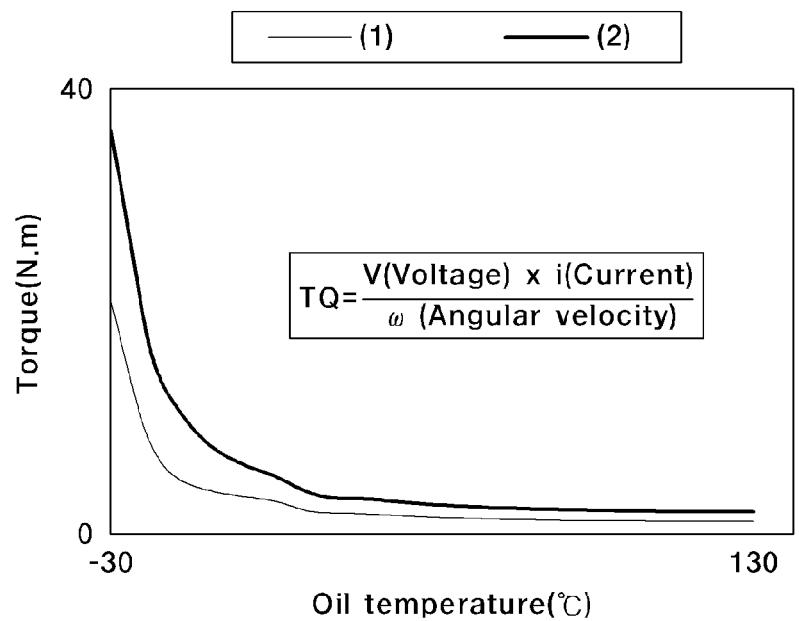
FIG. 5 is a diagram showing the relationship between a torque value and an oil temperature for producing a line pressure defined in a low speed control mode and in a middle speed control mode.

According to preferred exemplary embodiments, FIG. 5 is a diagram showing the relationship between a torque value and an oil (ATF) temperature for producing a line pressure defined in a low speed control mode in which the vehicle is stopped and in a middle speed control mode in which the vehicle is normally driven. Preferably, since the viscosity of the oil is associated with the temperature and torque value, the temperature is associated with the torque value as shown in FIG. 5.

Accordingly, in preferred exemplary embodiments, if the actual torque applied to the motor by the oil in the electric oil pump can be predicted, it is possible to accurately control the operation of the pump in which the current state of the oil is accurately reflected, instead of using the oil temperature.

Figure 6:
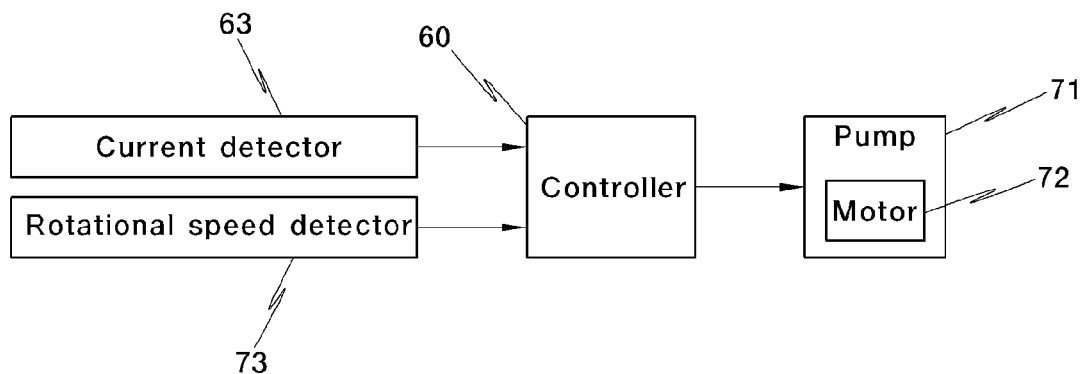
FIG. 6 is a block diagram showing the configuration of an apparatus for controlling the operation of an electric oil pump in accordance with an exemplary embodiment of the present invention.
Figure 7:
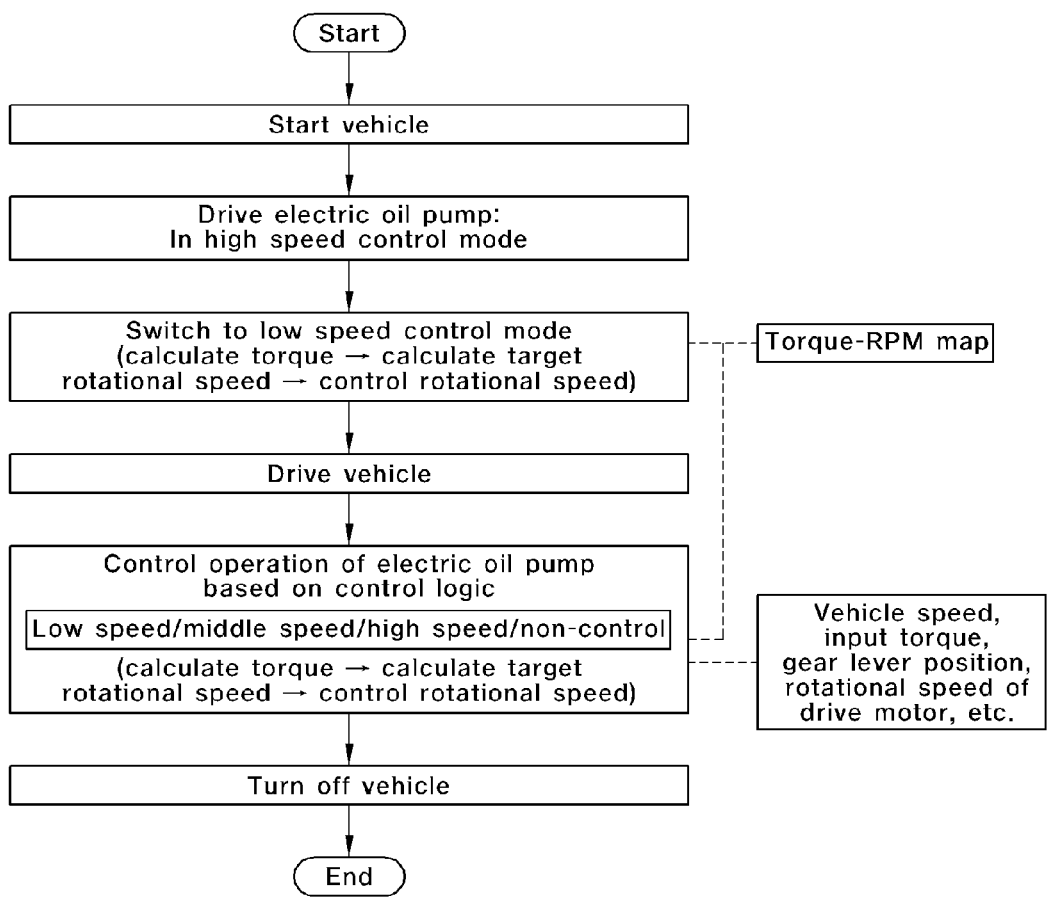
FIG. 7 is a flowchart showing a method for controlling the operation of an electric oil pump in accordance with another exemplary embodiment of the present invention.
Figure 8:
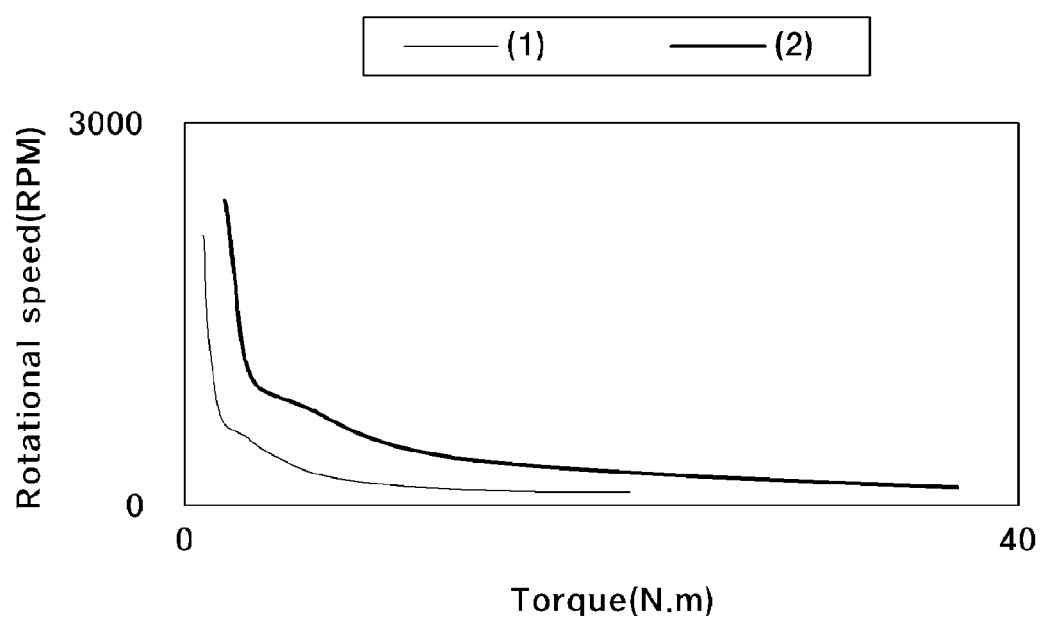
FIG. 8 is a diagram showing an example of a torque-RPM map used in the method of the present invention.

According to other exemplary preferred embodiments, FIG. 6 is a block diagram showing the configuration of an apparatus for suitably controlling the operation of an electric oil pump in accordance with an exemplary embodiment of the present invention. According to other exemplary preferred embodiments, FIG. 7 is a flowchart showing a method for controlling the operation of an electric oil pump in accordance with another exemplary embodiment of the present invention. According to still other exemplary preferred embodiments, FIG. 8 is a diagram showing an example of a torque-RPM map used in the method of the present invention.

Preferably, the control process of the present invention may be suitably performed under the control of a transmission control unit (TCU) and an oil pump control unit (OPU), in which the transmission control unit may suitably calculate a target rotational speed using a measurement value and transmit the calculated value to the oil pump control unit, and then the oil pump control unit may suitably control the rotational speed of the motor of the pump based on the transmitted value.

According to other further preferred embodiments, it can be understood that the oil pump control unit preferably includes a controller, which receives a command value from the transmission control unit through a CAN communication and feeds back the control result, and an inverter, which suitably inverts the phase of power based on a control signal of the controller to drive the motor of the pump (apply a three-phase current).

According to other further preferred embodiments of the present invention, the above-described transmission control unit and oil pump control unit can be suitably integrated into a single controller in the present invention. In preferred embodiments as described herein, a controller 60 shown in FIG. 6 will preferably calculate the target rotational speed from the measurement value and control the motor of the pump based on the calculated target rotational speed, instead of the transmission control unit and the oil pump control unit.

Preferably, first, in the method for controlling the operation of the electric oil pump according to the present invention, the control of the rotational speed of the motor based on the state of oil is suitably performed in a high speed control mode, a low speed control mode, and a middle speed control mode. However, there is no difference from the conventional method, in which the target rotational speed is suitably calculated using the map defined in each drive mode and the motor of the pump is controlled based on the target rotational speed.

That is, according to certain preferred exemplary embodiments and as shown in FIG. 7, for example, when the vehicle is started, the electric oil pump is driven in the high speed control mode for a predetermined short period of time such as several seconds to suitably ensure the hydraulic pressure response, in which the electric oil pump pumps the oil at high pressure momentarily to increase the hydraulic pressure in a hydraulic line to a predetermined pressure.

In further preferred embodiments, the high speed control mode is suitably converted to the low speed control mode such that the vehicle can be driven.

According to further exemplary embodiments, although the oil pump is preferably driven in the low speed control mode while the vehicle is suitably stopped and preferably driven in the middle speed control mode while the vehicle is suitably driven, the mode conversion is appropriately performed based on the vehicle state such as the vehicle speed, the transmission input torque, the position of a gear lever, and the rotational speed of the drive motor. Further, according to still other preferred embodiments of the present invention, the on/off of the electric oil pump is suitably determined depending on the variables such as the rotational speed of a mechanical oil pump and the transmission input torque. Preferably, if the line pressure can be suitably produced only with the mechanical oil pump based on the rotational speed of the mechanical oil pump and the transmission input torque, the operation of the electric oil pump is stopped.

Accordingly, in this method of the present invention, the target rotational speed for each drive mode is suitably calculated based on the torque value obtained from the current and the actually measured rotational speed, not based on the measured temperature value, and the rotational speed of the motor is suitably controlled based on the calculated target rotational speed.

Accordingly, after calculating the torque value, the operation of the pump is suitably controlled using a torque (TQ)-rotational speed (RPM) map for each drive mode. Therefore, in order to calculate the torque value, it is necessary to measure the current applied to the motor of the pump and the actual rotational speed of the motor.

Therefore, the apparatus for controlling the operation of the electric oil pump according to preferred embodiments of the present invention, for example as shown in FIG. 6, preferably includes a current detector 63 for suitably detecting the current input for the operation of a motor 72, a rotational speed detector 73 for suitably detecting the rotational speed of the motor 72, and the controller 60 for suitably controlling the operation of the motor 72 of the electric oil pump by suitably calculating the torque TQ of the pump based on the detection values of the current detector 63 and the rotational speed detector 73 and suitably calculating a target rotational speed RPM for each drive mode.

Preferably, the current detector 63 detects the input current applied to the motor 72 and, when the controller 60 is suitably divided into the transmission control unit and the oil pump control unit, the current detector 63 may be suitably configured to detect the current from an input terminal of the oil pump control unit.

Further, the rotational speed detector 73 suitably detects the actual rotational speed of the motor 72, and a speed sensor provided in the vehicle, i.e., a hall sensor, may preferably be used as the rotational speed detector 73.

According to further preferred embodiments, after calculating the torque value based on the input current detected by the current detector 63 and the actual rotational speed of the motor 72 detected by the rotational speed detector 73, the controller 60 suitably calculates the target rotational speed in real time using the calculated torque value as a control variable, and the calculation of the torque vale can preferably be performed by the following formula 1:

$$TQ = (V \times i)/\omega \qquad \text{[Formula 1]}$$

wherein TQ represent the torque, V represent the voltage, i represents the current detected by the current detector 63, and ω represents the angular velocity obtained from the rotational speed detected by the rotational speed detector 73.

According to further preferred embodiments, the voltage required for the calculation of the torque value is the driving voltage applied for the operation of the motor 72 and corresponds to the voltage of the battery for supplying the driving power to the pump (motor), i.e., the supply voltage (e.g., 12 V) of an auxiliary battery 74 shown in FIG. 1, which is a fixed value. Further, the angular velocity can be obtained from the measured rotational speed of the motor 72. As a result, the torque value can be calculated from formula 1.

Accordingly, after calculating the torque value using the values measured in real time, the target rotational speed is suitably calculated using the torque-RPM map for each drive mode, and the operation of the motor is controlled based on the target rotational speed.

Preferably, the controller 60 stores the torque-RPM map for each drive mode to calculate the target rotational speed, and the torque-RPM maps can be obtained from a previous test.

According to certain preferred embodiments of the present invention, when the controller 60 is suitably divided into the transmission control unit and the oil pump control unit, for example, the oil pump control unit suitably transmits the current and the rotational speed detected by the current detector and the rotational speed detector, respectively, to the transmission control unit, the transmission control unit suitably calculates the target rotational speed and transmits it to the oil pump control unit, and then the oil pump control unit controls the three-phase operation of the motor based on the rotational speed command value transmitted from the transmission control unit.

According to certain exemplary embodiments and referring to FIG. 8, for example, in which an example of the torque-RPM map for each drive mode is shown. The higher the actual viscosity of the oil, the more the load torque is suitably increased. Accordingly, if the load torque is higher, the rotational speed is suitably reduced. As such, the higher the actual viscosity of the oil, the more the rotational speed of the motor controlled by the method of the present invention is suitably reduced.

Figure 9:
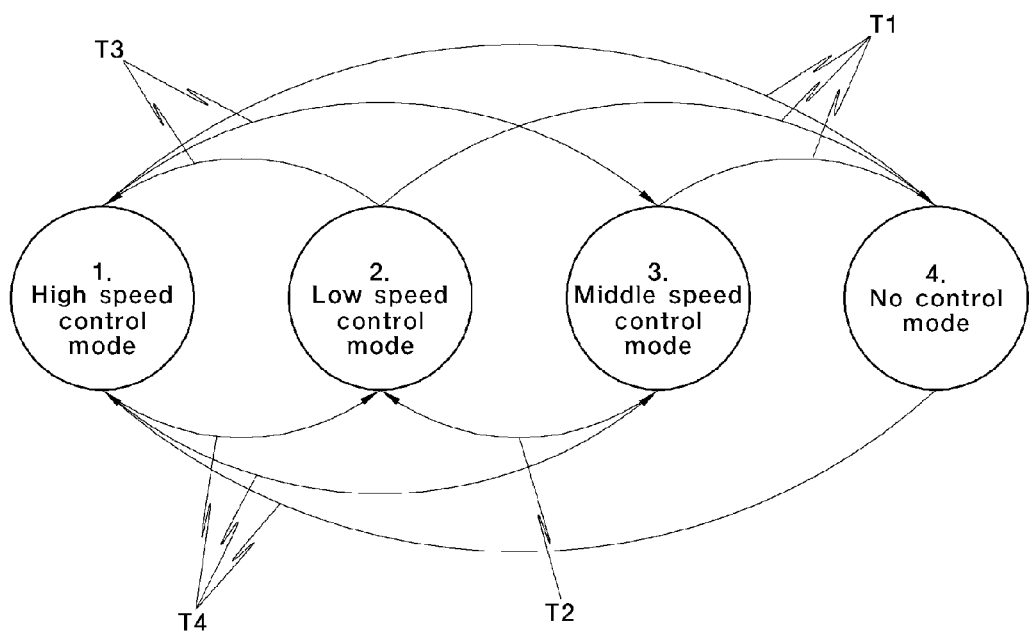
FIG. 9 is a diagram showing an example of a mode conversion in the method of the present invention.

Further, as shown in FIG. 9 for example, during the control process of the present invention, when a non-control mode, in which the operation of the electric oil pump is stopped, is converted to the middle speed control mode or low speed control mode, the high speed control mode is suitably performed before the mode conversion.

According to further preferred embodiments, when the drive mode is suitably converted from the low speed control mode to the middle speed control mode, the high speed control mode is first performed.

Preferably, during the mode conversion, the high speed control mode, in which the oil is pumped at high pressure for a predetermined short period of time, is suitably performed such that the hydraulic pressure in the hydraulic line is more rapidly increased to a predetermined pressure.

As described herein, according to preferred embodiments of the present invention, in the control of the operation of the electric oil pump, in which the actual state of the oil is reflected, the torque of the motor of the electric oil pump corresponding to the oil temperature is suitably calculated based on the current and the rotational speed of the oil pump, not based on the measured temperature value, and the rotational speed of the motor is controlled based on the calculated torque, thereby more accurately controlling the operation of the oil pump.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling the operation of an electric oil pump, the method comprising:
   detecting, at a current detector, a current applied to a motor of an electric oil pump;
   detecting, at a rotational speed detector, a rotational speed of the motor;
   calculating a load torque of the motor based on the current and the rotational speed detected by the current detector and the rotational speed detector and calculating a target rotational speed based on the detection values; and
   controlling the operation of the motor of the pump based on the calculated target rotational speed,
   wherein the operation of the motor is controlled in each drive mode based on the target rotational speed extracted from a predetermined torque-rotational speed map for each drive mode of the pump;

the drive modes comprise a high speed control mode in which a high pressure pumping force is applied for a predetermined period of time to increase the hydraulic pressure in a hydraulic line, a low speed control mode performed when a vehicle is stopped, a middle speed control mode performed when the vehicle is driven, and a non-control mode in which the operation of the pump is stopped; and when the non-control mode, in which the operation of the pump is stopped, is converted to the middle speed control mode or low speed control mode, the high speed control mode is performed before the mode conversion.

2. A method for controlling the operation of an electric oil pump, the method comprising:

detecting, at a current detector, a current applied to a motor of an electric oil pump;

detecting, at a rotational speed detector, a rotational speed of the motor;

calculating a load torque of the motor based on the current and the rotational speed detected by the current detector and the rotational speed detector and calculating a target rotational speed based on the detection values; and controlling the operation of the motor of the pump based on the calculated target rotational speed, wherein the operation of the motor is controlled in each drive mode based on the target rotational speed extracted from a predetermined torque-rotational speed map for each drive mode of the pump;

the drive modes comprise a high speed control mode in which a high pressure pumping force is applied for a predetermined period of time to increase the hydraulic pressure in a hydraulic line, a low speed control mode performed when a vehicle is stopped, a middle speed control mode performed when the vehicle is driven, and a non-control mode in which the operation of the pump is stopped; and when the drive mode is converted from the low speed control mode to the middle speed control mode, the high speed control mode is first performed.

* * * * *